(12) United States Patent
Roberts et al.

(10) Patent No.: US 7,831,611 B2
(45) Date of Patent: Nov. 9, 2010

(54) AUTOMATICALLY VERIFYING THAT ANTI-PHISHING URL SIGNATURES DO NOT FIRE ON LEGITIMATE WEB SITES

(75) Inventors: Guy Roberts, Milton Keynes (GB); John Sargent, Buckingham (GB); Dallas Engelken, Hutchinson, KS (US); Chris Barton, Steeple Claydon (GB); Nick Kelly, Milton Keynes (GB)

(73) Assignee: McAfee, Inc., Santa Clara, CA (US)

( * ) Notice: Subject to any disclaimer, the term of this patent is extended or adjusted under 35 U.S.C. 154(b) by 272 days.

(21) Appl. No.: 11/905,330

(22) Filed: Sep. 28, 2007

(65) Prior Publication Data

US 2009/0089287 A1    Apr. 2, 2009

(51) Int. Cl.
G06F 7/00 (2006.01)

(52) U.S. Cl. .................. 707/773; 709/225; 379/201.05

(58) Field of Classification Search ......... 707/709–720, 707/781–789, 769–774; 705/26, 37, 40, 705/44; 726/1, 7, 8, 24; 709/219–225; 379/201.01, 379/201.05
See application file for complete search history.

(56) References Cited

U.S. PATENT DOCUMENTS

| | | | |
|---|---|---|---|
| 6,018,724 A | 1/2000 | Arent | 705/44 |
| 6,065,055 A | 5/2000 | Hughes et al. | 709/229 |
| 6,285,999 B1 | 9/2001 | Page | 707/5 |
| 6,356,937 B1 | 3/2002 | Montville et al. | 709/206 |
| 6,539,430 B1 | 3/2003 | Humes | 709/225 |
| 6,606,659 B1 | 8/2003 | Hegli et al. | 709/225 |
| 6,785,732 B1 | 8/2004 | Bates et al. | 709/232 |
| 6,856,963 B1 | 2/2005 | Hurwitz | 705/10 |
| 6,938,003 B2 | 8/2005 | Harpale | 705/26 |
| 7,024,630 B2 | 4/2006 | Himmel et al. | 715/747 |
| 7,096,493 B1 | 8/2006 | Liu | 726/8 |
| 7,114,177 B2 | 9/2006 | Rosenberg et al. | 726/4 |
| 7,143,139 B2 | 11/2006 | Burbeck et al. | 709/206 |
| 7,207,480 B1 | 4/2007 | Geddes | 235/380 |
| 7,216,360 B2 | 5/2007 | Nakao et al. | 726/7 |
| 7,231,395 B2 | 6/2007 | Fain et al. | 707/101 |
| 7,257,549 B2 | 8/2007 | Karaoguz et al. | 705/26 |
| 7,313,691 B2 | 12/2007 | Bantz et al. | 713/155 |
| 7,370,188 B2 | 5/2008 | Rothman et al. | 713/2 |

(Continued)

OTHER PUBLICATIONS

Office Action Summary from U.S. Appl. No. 11/342,250 mailed on Feb. 26, 2010.

(Continued)

*Primary Examiner*—Wilson Lee
(74) *Attorney, Agent, or Firm*—Zilka-Kotab, PC

(57) ABSTRACT

A method and computer program product prevent false positives from occurring by reducing or preventing legitimate web site content from triggering matches to phishing black lists, but provides time and cost savings over manual review of black lists. A method implemented in a computer system for detecting false positives among a plurality of search patterns of web sites that include illegitimate content comprises accessing a first page of a legitimate web site, obtaining all links included in the first page, for each link included in the first page that points to a page on the web site, determining whether the link matches at least one of the plurality of search patterns, and for each link that matches the search pattern, indicating that the search pattern is a false positive.

19 Claims, 3 Drawing Sheets

U.S. PATENT DOCUMENTS

| | | | |
|---|---|---|---|
| 7,380,267 B2 | 5/2008 | Arai et al. .................... 726/1 |
| 7,765,481 B2 | 7/2010 | Dixon et al. |
| 2001/0054152 A1 | 12/2001 | Nakao et al. ................ 713/182 |
| 2001/0056550 A1 | 12/2001 | Lee ............................ 713/201 |
| 2002/0059364 A1 | 5/2002 | Coulthard et al. ........... 709/203 |
| 2002/0069129 A1 | 6/2002 | Akutsu et al. ................. 705/26 |
| 2002/0138402 A1 | 9/2002 | Zacharia et al. .............. 705/37 |
| 2002/0143885 A1 | 10/2002 | Ross ............................ 709/207 |
| 2002/0178381 A1 | 11/2002 | Lee et al. .................... 713/201 |
| 2002/0180778 A1 | 12/2002 | Proudler ..................... 345/734 |
| 2003/0018585 A1 | 1/2003 | Butler et al. ................. 705/53 |
| 2003/0023878 A1 | 1/2003 | Rosenberg et al. .......... 713/201 |
| 2003/0055737 A1 | 3/2003 | Pope et al. .................... 705/26 |
| 2003/0097591 A1 | 5/2003 | Pham et al. ................. 713/201 |
| 2003/0172166 A1 | 9/2003 | Judge et al. ................. 709/229 |
| 2003/0182421 A1 | 9/2003 | Faybishenko et al. ....... 709/224 |
| 2004/0107363 A1 | 6/2004 | Monteverde ................ 713/201 |
| 2004/0122926 A1 | 6/2004 | Moore et al. ................ 709/223 |
| 2004/0153414 A1 | 8/2004 | Khaishgi et al. ............. 705/58 |
| 2004/0167980 A1 | 8/2004 | Doyle et al. ................. 709/225 |
| 2004/0169678 A1 | 9/2004 | Oliver ........................ 345/738 |
| 2004/0199606 A1 | 10/2004 | Brown et al. ................ 709/219 |
| 2004/0210602 A1 | 10/2004 | Hillis et al. .............. 707/104.1 |
| 2005/0015506 A1 | 1/2005 | Padborg ..................... 709/229 |
| 2005/0033991 A1 | 2/2005 | Crane ......................... 713/201 |
| 2005/0044423 A1 | 2/2005 | Mellmer et al. ............. 713/201 |
| 2005/0076222 A1 | 4/2005 | Olkin et al. ................. 713/176 |
| 2005/0165680 A1 | 7/2005 | Keeling et al. ............... 705/40 |
| 2005/0216300 A1 | 9/2005 | Appelman et al. ............. 705/1 |
| 2006/0009994 A1 | 1/2006 | Hogg et al. .................... 705/1 |
| 2006/0015722 A1 | 1/2006 | Rowan et al. ............... 713/166 |
| 2006/0095404 A1 | 5/2006 | Adelman et al. ............... 707/3 |
| 2006/0095586 A1 | 5/2006 | Adelman et al. ............ 709/245 |
| 2006/0117389 A1 | 6/2006 | Pool ............................ 726/27 |
| 2006/0174343 A1 | 8/2006 | Duthie et al. ................. 726/23 |
| 2006/0212925 A1 | 9/2006 | Shull et al. .................... 726/1 |
| 2006/0235796 A1 | 10/2006 | Johnson et al. ............... 705/44 |
| 2006/0239430 A1* | 10/2006 | Gue et al. .............. 379/201.05 |
| 2006/0242026 A1 | 10/2006 | Crespo et al. ................. 705/26 |
| 2006/0265417 A1 | 11/2006 | Amato et al. ............... 707/102 |
| 2007/0028304 A1 | 2/2007 | Brennan ...................... 726/24 |
| 2007/0039038 A1* | 2/2007 | Goodman et al. .............. 726/2 |
| 2007/0088652 A1 | 4/2007 | Firmage et al. ............... 705/37 |
| 2007/0130350 A1 | 6/2007 | Alperovitch et al. ........ 709/229 |
| 2008/0028029 A1* | 1/2008 | Hart ........................... 709/206 |
| 2008/0250159 A1* | 10/2008 | Wang et al. ................. 709/239 |

OTHER PUBLICATIONS

Final Office Action Summary from U.S. Appl. No. 11/837,067 mailed on Mar. 1, 2010.
Final Office Action Summary from U.S. Appl. No. 11/342,322 mailed on Mar. 1, 2010.
Final Office Action Summary from U.S. Appl. No. 11/837,050 mailed on Apr. 7, 2010.
Office Action Summary from U.S. Appl. No. 11/395,758 mailed on Apr. 14, 2010.
Advisory Action Summary from U.S. Appl. No. 11/342,319 mailed on Apr. 21, 2010.
Notice of Allowance from U.S. Appl. No. 11/342,297 mailed on May 26, 2010.
Final Office Action Summary from U.S. Appl. No. 11/852,948 mailed on May 26, 2010.
Non-Final Office Action Summary from U.S. Appl. No. 11/837,067 mailed on Jul. 12, 2010.
Final Office Action Summary from U.S. Appl. No. 11/342,343 mailed on Jul. 14, 2010.
Final Office Action from U.S. Appl. No. 11/342,342, dated Jul. 26, 2010.

* cited by examiner

AUTOMATICALLY VERIFYING THAT ANTI-PHISHING URL SIGNATURES DO NOT FIRE ON LEGITIMATE WEB SITES

BACKGROUND OF THE INVENTION

1. Field of the Invention

The present invention relates to reducing or preventing legitimate web site content from triggering matches to anti-phishing black lists.

2. Description of the Related Art

Phishing attacks are computerized ploys that are intended to steal consumers' personal identity data and financial account credentials. Examples of phishing schemes include using 'spoofed' e-mails to lead consumers to counterfeit websites designed to trick recipients into divulging financial data such as credit card numbers, account usernames, passwords and social security numbers. Hijacking of brand names of banks, e-retailers and credit card companies, are often used to convince recipients to respond.

Most phishing attacks today are done by the phisher placing the fake website content on a legitimate website. They do this by hacking into the site and placing the content in an area that they create and upload files to. They then send out the URL to the uploaded web content in a fraudulent email. The victim then clicks on the URL in the email which takes them to the area of the website created by the phisher.

As an example, take a legitimate site such as http://www.myfamilyphotos.com. The phisher will hack into the web server hosting www.myfamilyphotos.com and place the illegitimate content, such as fraudulent content in a location such that it can be referenced by a URL such as http://www.myfamilyphotos.com/subdir/hackedpage.asp. To a user, this URL may appear legitimate, as the illegitimate content is in fact actually present on the legitimate website server. Of course, the illegitimate content may be any sort of web application, file or content, not just an .asp page.

Many Anti-Phishing solutions block access to illegitimate sites by providing a black list. This black list includes a list of domains known to have illegitimate content on them. For example, myfamilyphotos.com would be one such domain. Also included in the black list is a list of search patterns or signatures for each listed domain, as there may be more than one illegitimate site on a domain. These search patterns are commonly in regular expression format, but don't have to be. A regular expression is a string that is used to describe or match a set of strings, according to certain syntax rules. To determine if a URL points to illegitimate phishing content, the domain part of the URL is extracted and then the list of search patterns is retrieved from the black list. These search patterns are then evaluated against the full URL. If the full URL matches one or more of the search patterns, the URL is determined to be a phishing site. These black lists are built by automatically and manually processing phishing samples.

A problem arises in trying to ensure that the search patterns do not match a legitimate part of a web site. Such a match is known as a false positive. False positives in phishing black lists are increasingly common as phishing attacks increase in number. False positives are undesirable as they will block access to legitimate web content. In order to reduce false positives, the black lists may be manually reviewed. However, due to the vast number of web sites in existence, black lists tend to be very large. Manual review of such black lists is very time consuming and expensive. A manual review step will also delay the availability of the new black list entry increasing the window of time that the solution does not protect against the illegitimate content.

A need arises for a technique that prevents false positives from occurring by reducing or preventing legitimate web site content from triggering matches to phishing black lists, but which provides time and cost savings over manual review of black lists.

SUMMARY OF THE INVENTION

The present invention provides prevents false positives from occurring by reducing or preventing legitimate web site content from triggering matches to phishing black lists, but provides time and cost savings over manual review of black lists. The ability to automatically check for false positives also allows black list listings times to be quicker and also allows the techniques and process that generate black list entries to be more aggressive and take more risk. Both of these advantages mean Anti-Phishing detection and coverage is improved. In the extreme case, brute-force generation of match criteria could be employed and executed against this algorithm. When a brute-force signature passes the algorithm without recording a false-positive it can be used as a signature.

A method implemented in a computer system for detecting false positives among a plurality of search patterns of web sites that include illegitimate content comprises accessing a first page of a legitimate web site, obtaining all links included in the first page, for each link included in the first page that points to a page on the web site, determining whether the link matches at least one of the plurality of search patterns, and for each link that matches the search pattern, indicating that the search pattern is a false positive. The search pattern may be included in a list of web sites that include illegitimate content. Each search pattern may be a regular expression. A search pattern that is a false positive may be indicated by including the search pattern in a list of false positives. A search pattern that is a false positive may be indicated in the list of web sites that include illegitimate content.

The method may further comprise, for each link that points to a page on the web site, recursively accessing a page pointed to by the link, obtaining all links in the page, for each link included in the page that points to a page on the web site, determining whether the link matches at least one of the plurality of search patterns, and for each link that matches the search pattern, indicating that the search pattern is a false positive.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
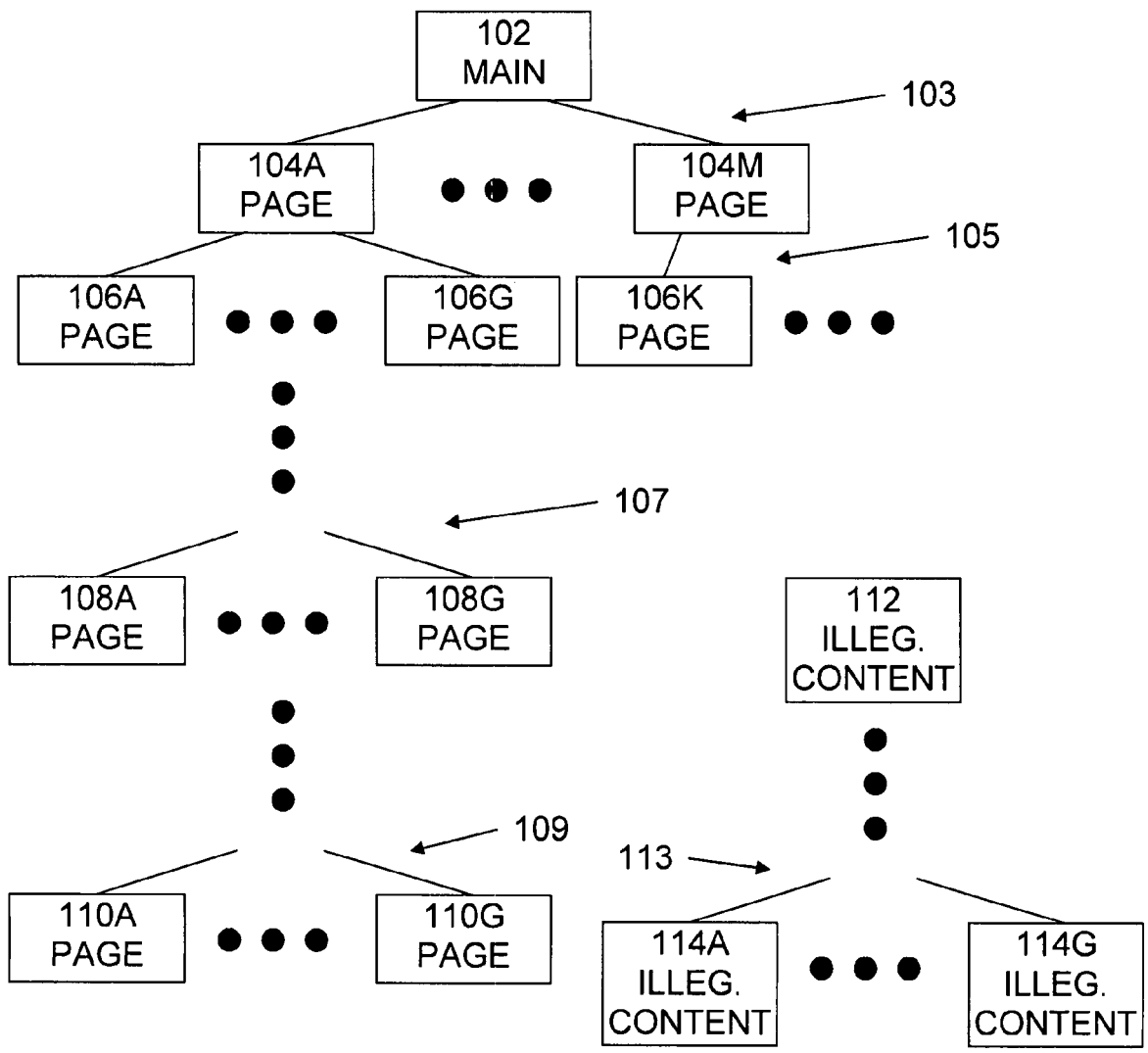
FIG. 1 is an exemplary block diagram of a web site including both legitimate and illegitimate content.

The present invention provides prevents false positives from occurring by reducing or preventing legitimate web site content from triggering matches to phishing black lists, but provides time and cost savings over manual review of black lists. The solution revolves around the fact that legitimate parts of a website are usually all linked together by hyperlinks and are accessible by following hyperlinks starting at the main page. An example of such a website 100 is shown in FIG. 1. Website 100 includes a main page 102, which is typically the page at which a user starts accessing the website, although the user may start accessing the website at another page. Main page 102 includes one or more links 103 which provide access to additional web pages 104A-M. Each web page 104A-M may include one or more links to additional web pages 106A-K. These web pages may in turn include links 107 to additional web pages 108A-G, which may themselves include links 109 to additional web pages 110A-G. Although, for simplicity, in FIG. 1 web pages and links are shown hierarchically, it is well-known that any web page may link with any other web page. Web pages linked to main page 102, including web pages 104A-M, 106A-K, 108A-G, and 110A-G comprise the legitimate content of website 100. However, in addition to this legitimate content, website 100 includes illegitimate content, such as illegitimate content page 112. Illegitimate content page 112 may link 113 to additional illegitimate content pages 114A-G. However, it is quite unlikely that there are any links from legitimate content pages 102, 104A-M, 106A-K, 108A-G, and 110A-G to any of the illegitimate content pages 112 and 114A-G.

For example, all legitimate parts of the family photos website discussed above are likely to be accessible from the home page at http://www.myfamilyphotos.com, but it is extremely unlikely for there to be a link to the phish page at http://www.myfamilyphotos.com/subdir/hackedpage.asp from the legitimate part of the website.

The present invention provides an automated way to build confidence that the black list entry search patterns or signatures will not detect false positives on legitimate content by checking that no legitimate part of the website links to the illegitimate part and that no part of the web site accessible from the home page matches the search pattern.

Figure 2:
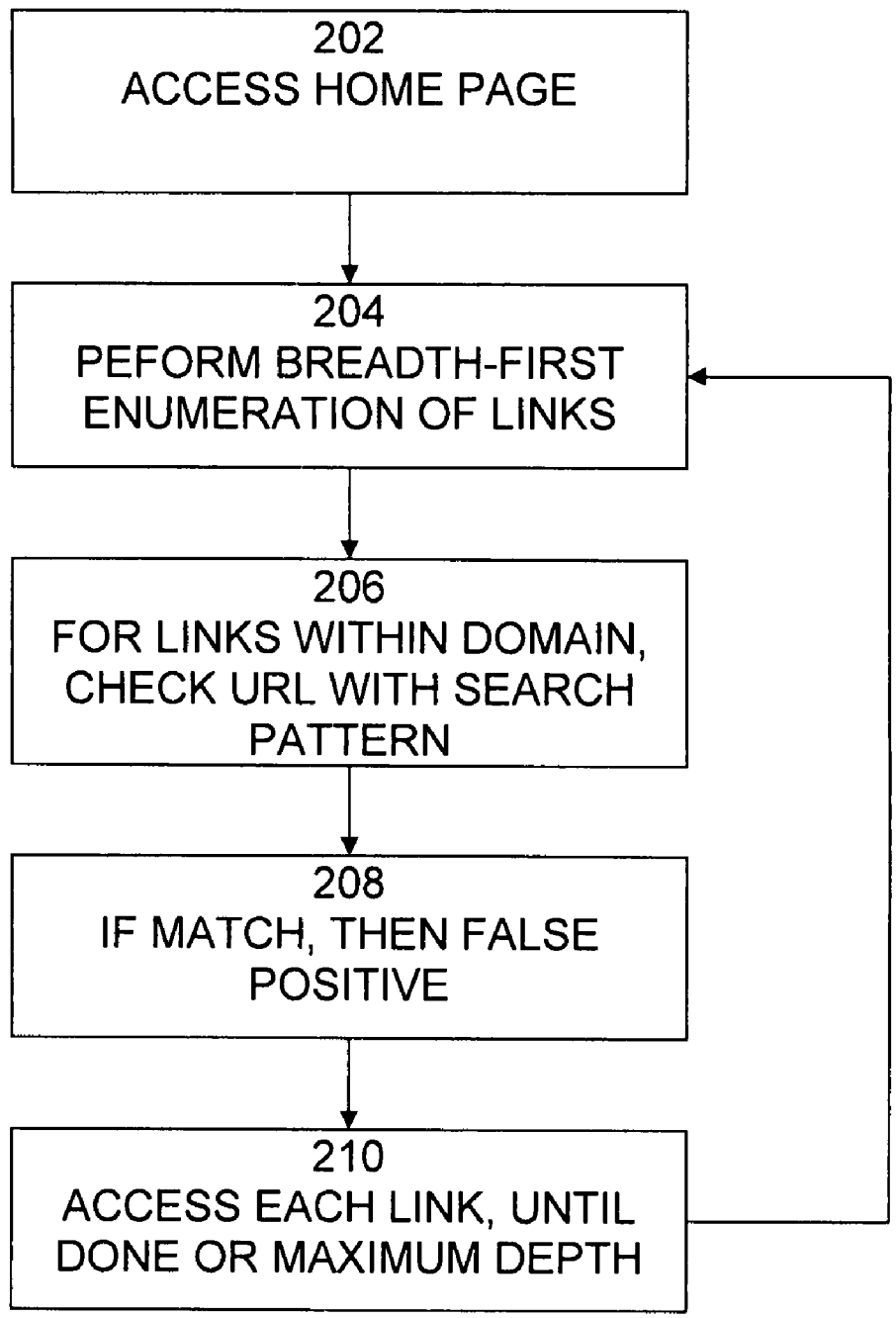
FIG. 2 is an exemplary flow diagram of a process for detecting and indicating false positives.

An example of an implementation of process 200 for detecting and indicating false positives is shown in FIG. 2. Process 200 begins with step 202, in which the home page of the website to be checked is accessed. In step 204, a breadth-first enumeration of all links included in the home page is performed. In a breadth-first enumeration, all of the links in the home page are collected, but none of them are accessed or followed, yet. In step 206, each collected link is examined to determine whether it points to a page in the website being checked. For example, those links that include the same top-level domain name as the homepage of the website being checked would be determined to point to a page in the website. For those links that that point to a page in the website being checked, the URL of each link is checked against each of the search patterns in the black list. In step 208, if a URL of a link matches a search pattern in the black list, then a false positive has been detected. In this case, the search pattern is flagged or listed for later revision.

In step 210, each link that was checked in step 206 is accessed and for each resulting page, the process repeats at step 204. Thus, each level of website content is crawled and the checks on the links are repeated, until the whole site has been checked. As many links on websites are circularly referential or are dynamic, to prevent infinite recursion on circular references or on dynamic content, a maximum recursion depth is defined.

Figure 3:
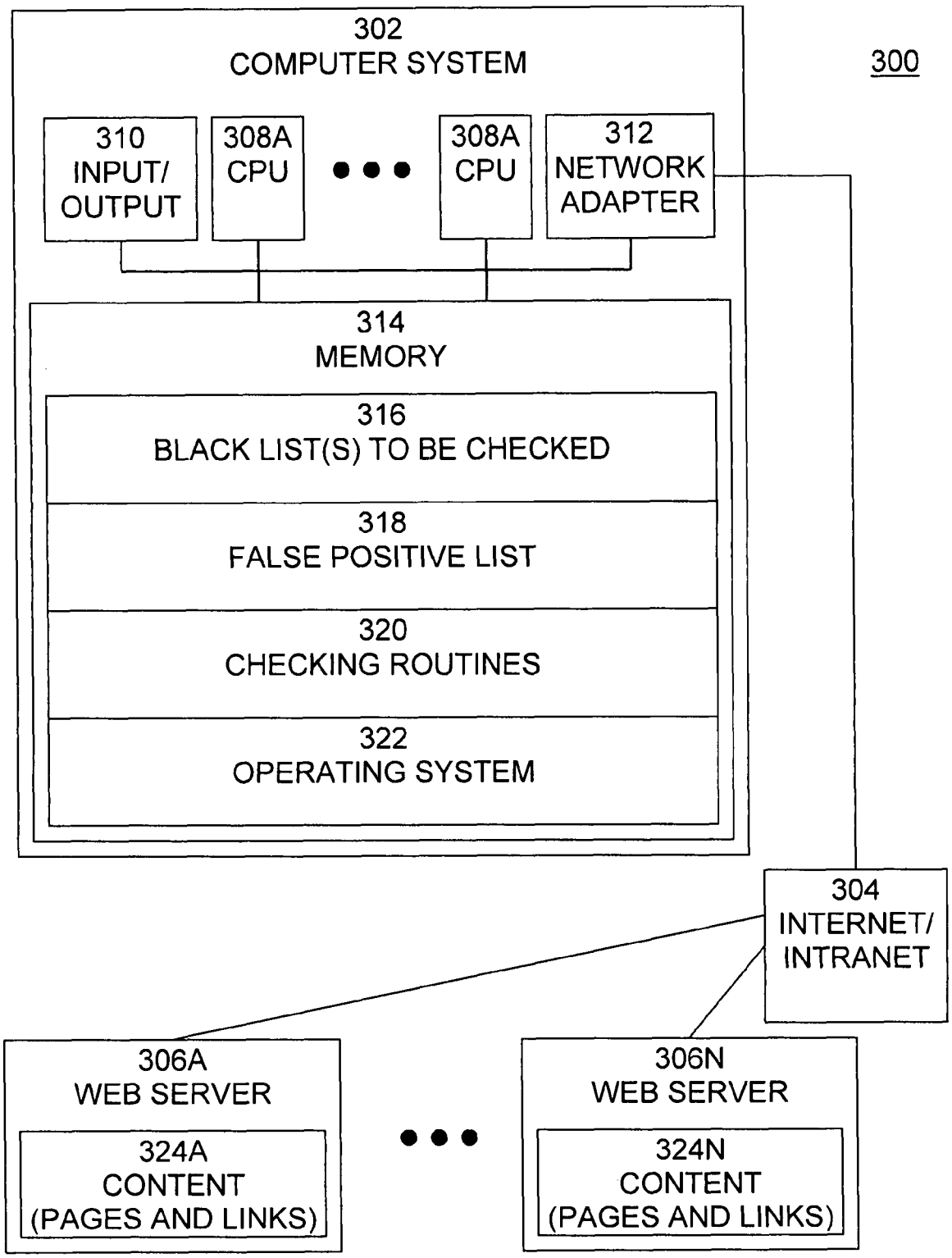
FIG. 3 is an exemplary block diagram of a system, in which the present invention may be implemented.

An exemplary block diagram of a system 300, in which the present invention may be implemented, is shown in FIG. 3. System 300 includes computer system 302, network 304, and one or more web servers 306A-N. Computer system 302 is typically a programmed general-purpose computer system, such as a personal computer, workstation, server system, and minicomputer or mainframe computer. Computer system 302 includes one or more processors (CPUs) 308A-308N, input/output circuitry 310, network adapter 312, and memory 314. CPUs 308A-308N execute program instructions in order to carry out the functions of the present invention. Typically, CPUs 308A-308N are one or more microprocessors, such as an INTEL PENTIUM® processor. FIG. 3 illustrates an embodiment in which computer system 302 is implemented as a single multi-processor computer system, in which multiple processors 308A-308N share system resources, such as memory 314, input/output circuitry 310, and network adapter 312. However, the present invention also contemplates embodiments in which computer system 302 is implemented as a plurality of networked computer systems, which may be single-processor computer systems, multi-processor computer systems, or a mix thereof.

Input/output circuitry 310 provides the capability to input data to, or output data from, computer system 302. For example, input/output circuitry may include input devices, such as keyboards, mice, touchpads, trackballs, scanners, etc., output devices, such as video adapters, monitors, printers, etc., and input/output devices, such as, modems, etc. Network adapter 312 interfaces computer system 302 with Internet/intranet 304. Internet/intranet 304 may include one or more standard local area network (LAN) or wide area network (WAN), such as Ethernet, Token Ring, the Internet, or a private or proprietary LAN/WAN.

Memory 314 stores program instructions that are executed by, and data that are used and processed by, CPU 302 to perform the functions of computer system 302. Memory 304 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 314 varies depending upon the function that computer system 302 is programmed to perform. In the example shown in FIG. 3, memory 314 includes black list(s) to be checked 316, false positive list 318, checking routines 320, and operating system 328. Black list(s) to be checked 316 include one or more black lists that are to be checked for false positives. Each black list includes a list of domains known to contain illegitimate content and a list of search patterns for each listed domain, as there may be more than one illegitimate site on a domain. These search patterns may be in regular expression format. A regular expression is a string that is used to describe or match a set of strings, according to certain syntax rules. False positive list 318 includes those search patterns that have been found by checking routines 320 to match legitimate content on a web site. False positive list 318 may be stored or transmitted for use in revising the included search patterns to avoid false positives. Alternatively, false positives may be flagged directly in one or more black lists 316. Checking routines 320 are software routines that check the search patterns included in black lists 316 for false positives, and which generates false positive list 318 or flags the false positive search patterns directly in one or more black lists 316. Operating system 328 provides overall system functionality.

Web servers 306A-N are computer systems and/or computer programs that are responsible for accepting HTTP requests from clients, such as web browsers, and serving them HTTP responses along with optional data contents, which usually are web pages such as HTML documents and linked objects (images, etc.). Each web server 306A-N includes content 324A-N, which typically includes web pages and links among web pages. The content 324A-N may include legitimate content, illegitimate content, or both legitimate and illegitimate content, as shown in FIG. 1.

As shown in FIG. 3, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include storage media, examples of which include, but are not limited to, floppy disks, hard disk drives, CD-ROMs, DVD-ROMs, RAM, and, flash memory, as well as transmission media, examples of which include, but are not limited to, digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented in a computer system for detecting false positives among a plurality of search patterns of web sites that include illegitimate content comprising:
   accessing a first page of a legitimate web site;
   obtaining all links included in the first page;
   for each link included in the first page that points to a page on the web site, determining whether the link matches at least one of the plurality of search patterns;
   for each link that matches the search pattern, indicating that the search pattern is a false positive; and
   for each link that points to a page on the web site, recursively:
      accessing a page pointed to by the link;
      obtaining all links in the page;
      for each link included in the page that points to a page on the web site, determining whether the link matches at least one of the plurality of search patterns; and
      for each link that matches the search pattern, indicating that the search pattern is a false positive;
   wherein each search pattern is a regular expression.

2. The method of claim 1, wherein the search pattern is included in a list of web sites that include illegitimate content.

3. The method of claim 2, wherein each search pattern is a regular expression.

4. The method of claim 3, wherein a search pattern that is a false positive is indicated by including the search pattern in a list of false positives.

5. The method of claim 3, wherein a search pattern that is a false positive is indicated in the list of web sites that include illegitimate content.

6. The method of claim 1, wherein the search pattern is included in a list of web sites that include illegitimate content.

7. The method of claim 1, wherein a search pattern that is a false positive is indicated by including the search pattern in a list of false positives.

8. The method of claim 1, wherein a search pattern that is a false positive is indicated in the list of web sites that include illegitimate content.

9. The method of claim 1, wherein the recursion is performed to a predefined maximum depth.

10. The method of claim 2, wherein each search pattern that is indicated as a false positive is listed for a later revision of the list.

11. A computer program product for detecting false positives among a plurality of search patterns of web sites that include illegitimate content comprising:
   a computer readable storage medium;
   computer program instructions, recorded on the computer readable storage medium, executable by a processor, for performing the steps of:
      accessing a first page of a web site;
      obtaining all links included in the first page;
      for each link pointing to a page on the web site, determining whether the link matches at least one search pattern;
      for each link that matches the search pattern, indicating that the search pattern is a false positive; and
      for each link that points to a page on the web site, recursively:
         accessing a page pointed to by the link;
         obtaining all links in the page;
         for each link included in the page that points to a page on the web site, determining whether the link matches at least one of the plurality of search patterns; and
         for each link that matches the search pattern, indicating that the search pattern is a false positive;
   wherein each search pattern is a regular expression.

12. The computer program product of claim 11, wherein the search pattern is included in a list of web sites that include illegitimate content.

13. The computer program product of claim 12, wherein each search pattern is a regular expression.

14. The computer program product of claim 13, wherein a search pattern that is a false positive is indicated by including the search pattern in a list of false positives.

15. The computer program product of claim 13, wherein a search pattern that is a false positive is indicated in the list of web sites that include illegitimate content.

16. The computer program product of claim 11, wherein the search pattern is included in a list of web sites that include illegitimate content.

17. The computer program product of claim 11, wherein a search pattern that is a false positive is indicated by including the search pattern in a list of false positives.

18. The computer program product of claim 11, wherein a search pattern that is a false positive is indicated in the list of web sites that include illegitimate content.

19. The computer program product of claim 11, wherein the recursion is performed to a predefined maximum depth.

* * * * *